US005214833A

United States Patent [19]

Yada

[11] Patent Number: 5,214,833

[45] Date of Patent: Jun. 1, 1993

[54] METHOD OF MANUFACTURING AN INNER CUTTER FOR A DRY SHAVER

[75] Inventor: Shiro Yada, Hikone, Japan

[73] Assignee: Matsushita Electric Works, Ltd., Kadoma, Japan

[21] Appl. No.: 913,195

[22] Filed: Jul. 14, 1992

[30] Foreign Application Priority Data

Jul. 15, 1991 [JP] Japan .................................. 3-172919

[51] Int. Cl.[5] ............................................ B23D 25/00

[52] U.S. Cl. .................................... 29/418; 29/527.2; 29/527.3; 29/558; 76/101.1; 72/379.2

[58] Field of Search .................... 29/412, 527.3, 527.2, 29/558, 414; 72/325, 326, 379.2; 76/DIG. 8, 104.1, 101.1, 116; 30/43, 346.5, 43.6

[56] References Cited

U.S. PATENT DOCUMENTS 3,858,461 1/1975 Tolmie .............................. 76/104 R 4,033,034 7/1977 Imai et al. .......................... 30/43.92

*Primary Examiner*—Timothy V. Eley
*Assistant Examiner*—Kenneth J. Hansen
*Attorney, Agent, or Firm*—Armstrong, Westerman, Hattori, McLeland & Naughton

[57] ABSTRACT

An inner cutter for a dry shaver of the present invention includes a plurality of arcuate blades, a plastic frame for supporting the blades, a joint portion for connection with a driving system of the shaver. The arcuate blades are formed from a single piece of a thin metal sheet. The process of forming the blades includes: the step of forming a plurality of arcuate cut edges in the metal sheet such that each span of the cut edges is disposed in parallel with each other, the step of bending the individual arcuate cut edges along the span and normal to the plane of the sheet in order to form the arcuate blades, the step of forming a plurality of recesses in the sheet near the arcuate cut edge for relaxing a shrinkage stress of the plastic frame at the time of the following molding step, the step of molding in the arcuate blades into the plastic frame so as to tightly support the blades, the step of isolating the individual arcuate blades from the metal sheet but supporting the blades only with the plastic frame. Therefore, as the arcuate blades are tightly supported only by the plastic frame, the inner cutter provides excellent shearing performance of hairs without warping the blades when it is reciprocated relative to an outer cutter for shearing hairs. And, there is no problem with respect to cracks of the plastic frame resulted from a shrinkage stress of the plastic.

6 Claims, 12 Drawing Sheets

23A
42A
15A
12A 30A
15A
12A
13A 39A
11A
15A
12A 20A
10Ab
34A
30A
10Ab 20A
15A
30A
10Aa
10Ab 18A
15A
30A
43A

METHOD OF MANUFACTURING AN INNER CUTTER FOR A DRY SHAVER

BACKGROUND OF THE INVENTION

1. Field of the invention

The present invention relates to an inner cutter for a dry shaver, and more particularly a process of forming the inner cutter having a plurality of archlike blades which are supported only with a plastic frame.

2. Description of the Prior Art

As described in U.S. Pat. No.3,858,461, the prior art method of forming a landless inner cutter for an electric shaver has included the steps of removing material from a strip of sheet metal to provide the strip with a first archlike edge which has a rise and a span, cutting a second archlike edge in the strip which is longitudinally displaced such that the span of the second edge intersects with the rise of the first edge, bending the resulting arch-shaped blade section between the archlike edges out of and normal to the plane of the strip, so as to provide a normally disposed, arch-shaped blade section and to expose another first archlike edge in the plane of the strip, and repeating the cutting and bending steps, as necessary, to provide a plurality of equidistantly-spaced, normally disposed, arch-shaped blade sections in the strip. Each of the arch-shaped blade sections is supported only at the spaced side portions of the blade section relative to the strip, so that all of the blade sections have an unitary structure with the strip. Therefore, the prior art provides a process for readily forming closely spaced blade sections of the inner cutter in a strip of the sheet metal without forming lands between the blade sections. However, as the spaced side portions do not have enough strength to tightly support the blade sections, the inner cutter does not have good shearing performance when it is reciprocated relative to an outer cutter for shearing hairs. On the other hand, for improving the strength, it is considered that the spaced side portions of the blade sections are reinforced with a plastic. However, a large amount of shrinkage of the plastic occurs after the spaced side portions have been reinforced by the plastic. As the individual blade sections are connected with the metal sheet molded in the plastic frame, a total shrinkage stress of the plastic generated between the plastic frame and the metallic blade sections is very large, so that some cracks are generated in the plastic frame. As a consequence, the strength is not improved.

SUMMARY OF THE INVENTION

The above problems and insufficiencies have been improved in the present invention which provides an improved inner cutter for a dry shaver. The inner cutter comprises a plurality of archlike blades which are supported on a molded plastic frame to align along the length of the plastic frame in substantially parallel relation to each other. The archlike blades are formed from a single piece of an elongated metal sheet.

A process of forming the inner cutter of the present invention includes the step of cutting into the metal sheet to have a plurality of arcuate cut edges aligned along the length of the metal sheet. A plane between the adjacent two arcuate cut edges is defined as a archlike blade sections. Each of the arcuate cut edges has the same span and rise. The blade sections are then bent along the span of the arcuate cut edges and substantially normal to the plane of the metal sheet in order to form archlike blades on the sheet. The archlike blades are arranged between opposed marginal side portions of the sheet and also interconnected with each other by way of webs through the marginal side portions. Each of the webs extends in the plane of the sheet between lower end portions of the adjacent archlike blades. Subsequently, the lower end portions of the individual archlike blades including the webs are molded in the plastic frame such that the individual blades are tightly supported with the plastic frame. As the individual archlike blades are formed on a single piece of the sheet, the blades are easily and simultaneously molded in the plastic frame. The marginal side portions are then removed from the webs connecting with the lower end portions of the blades, so that the individual archlike blades are isolated from each other and also are supported only with the plastic frame. Therefore, as a total shrinkage stress of the plastic generated between the plastic frame and the metallic archlike blades is very small, there is no problem with respect to cracks of the plastic frame resulted from the shrinkage stress. And besides, as the inner cutter has a plurality of the archlike blades which are strongly supported with the plastic frame, the inner cutter provides excellent shearing performance of hairs without warping the blades when it is reciprocated relative to an outer cutter for shearing hairs.

Accordingly, it is a primary object of the present invention to provide a simple process of forming an inner cutter having a plurality of archlike blades which are strongly supported with a plastic frame.

After the archlike blades have been molded in the plastic frame, the archlike blades are cut off from the marginal side portions at separation lines which extend longitudinally of the sheet. The separation lines are also defined such that each of the webs is separated from one of the two adjacent archlike blades while being held integral with the other archlike blade after cutting off the marginal side sections from the archlike blades. Therefore, the inner cutter having the archlike blades which are strongly supported only with the plastic frame is easily formed by cutting off the marginal side portions at the separation lines.

When each of the webs is of a triangular configuration having two sides merging with the lower end portion of one of the two adjacent archlike blades and with the side marginal portion, the separation lines are easily determined between the webs and the marginal side portions.

In a preferred embodiment of the present invention, before molding in the archlike blades into the plastic frame, the webs are bent so as to have a particular angle relative to the surface of the sheet. After molding in the plastic frame, the bending webs embed such like anchors in the plastic frame, so that the archlike blades are strongly supported with the frame.

Therefore, it is a further object of the present invention to provide a simple process of forming an inner cutter having a plurality of archlike blades which are strongly supported with a plastic frame, the process including a step of bending webs so as to embed the webs such like anchor in the frame.

In a preferred embodiment of the present invention, the marginal side portions are formed with recesses adjacent the webs for relaxing a shrinkage stress of the plastic at the time of molding the plastic into the support around the webs. Therefore, when the archlike blades having the recesses are molded in the plastic frame, there is no problem with respect to cracks of the frame.

Therefore, it is a further object of the present invention to provide a simple process of forming an inner cutter having a plurality of archlike blades which are strongly supported with a plastic frame, the process including a step of forming recesses adjacent to webs in order to prevent cracks of the frame.

BRIEF DESCRIPTION OF THE DRAWINGS

FIGS. 18A and 18B show the metal sheet including the archlike blades molded in a plastic frame, wherein FIG. 18A is a top plan view thereof and FIG. 18B is a cross section of FIG. 18A;

FIGS. 19A and 19B show an the metal sheet of FIG. 18A, wherein FIG. 19A is a top plan view of the blades forming section and locating sections and FIG. 19B is a cross section of the blades forming section;

FIGS. 20A and 20B show the inner cutter having the archlike blades supported only with the plastic frame, wherein FIG. 20A is a top plan view thereof and FIG. 20B is a cross section of FIG. 20A;

DESCRIPTION OF THE PREFERRED EMBODIMENTS

Figure 1:
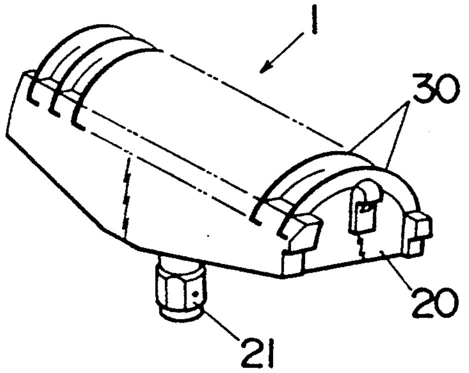
FIG. 1 is a perspective view of an inner cutter for a dry shaver, the inner cutter including a plurality of archlike blades, an elongated plastic frame for supporting the blades and a joint portion for connecting with a driving system of the shaver according to the present invention.
Figure 2:
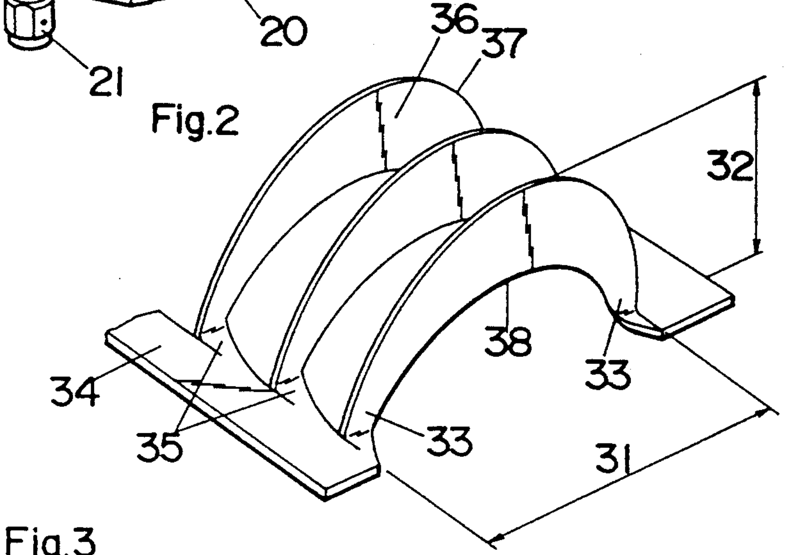
FIG. 2 is a fragmentary perspective view of the archlike blades formed on a single piece of metal sheet according to the present invention.
Figure 3:
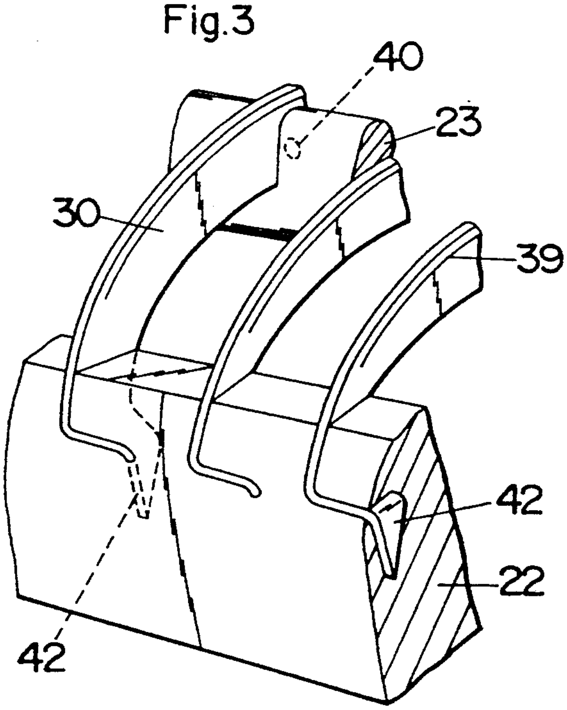
FIG. 3 is a fragmentary perspective view of the inner cutter having the archlike blades supported with the plastic frame, the frame including a center plastic support and side plastic supports.
Figure 4:
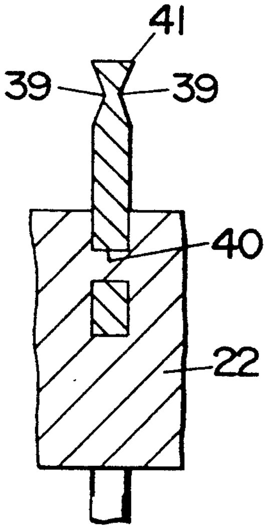
FIG. 4 is a cross sectional view of one of the archlike blades of the inner cutter.
Figure 5:
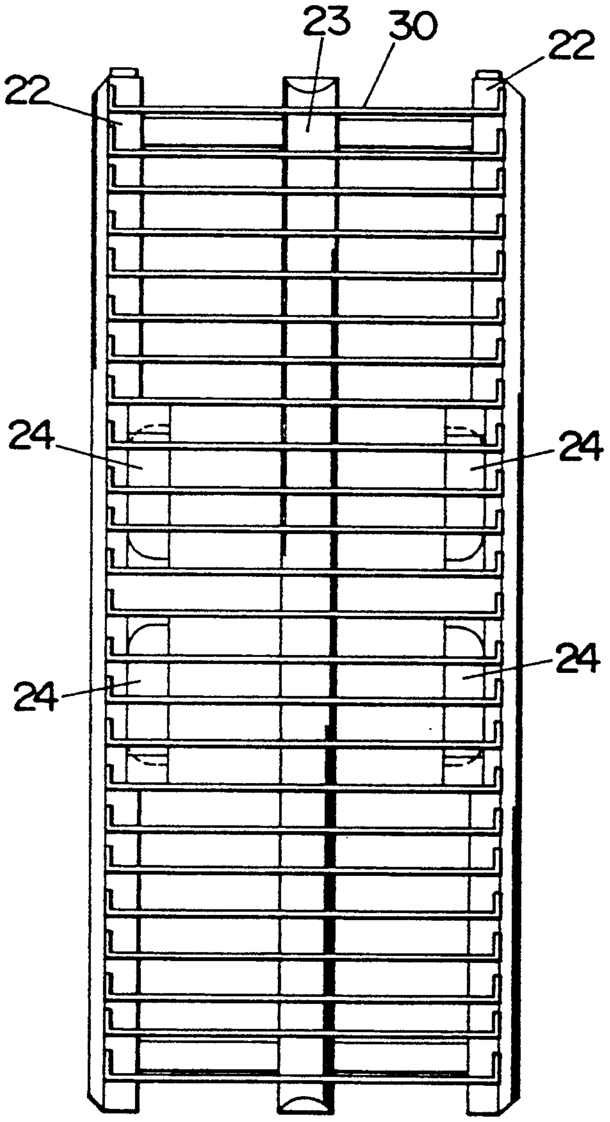
FIG. 5 is a top plan view of the inner cutter of FIG. 1.
Figure 6:
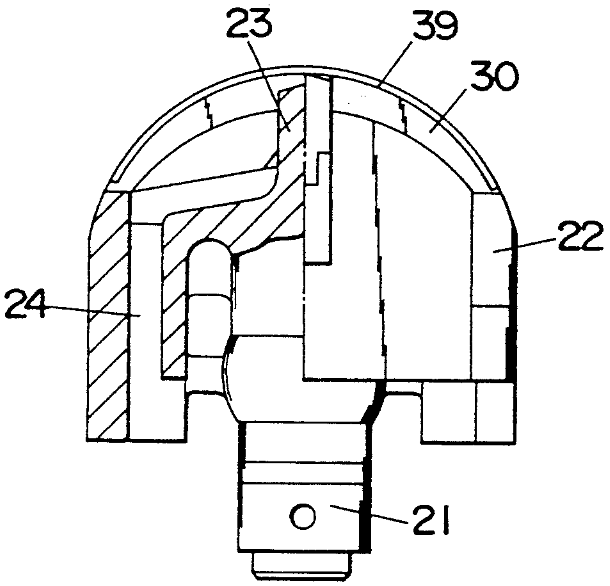
FIG. 6 is a side elevational view, partially cross section, of the inner cutter of FIG. 1.

An embodiment of the present invention is explained below. As shown in FIG. 1, an inner cutter 1 for a dry shaver of the present invention includes a plurality of archlike blades 30, and a body supporting portion 20 made of a plastic and a joint portion 21 for connecting with a driving system of the dry shaver. FIG. 2 shows the archlike blades formed from a single piece of elongated metal sheet 10 prior to completing the inner cutter. The blades 30, each of which has the same span 31 and rise 32 are disposed in parallel with the adjacent blades. The lower end portions 33 of the archlike blades 30 are connected with marginal side portions 34 through webs 35 which have a triangular configuration. The individual archlike blades are molded in plastic frame 20 including side plastic supports 22 and a center plastic support 23 as shown in FIG. 3. The lower end portions 33 of the blades 30 are strongly supported with the side plastic supports 22 by embedding anchors 44, each of which is formed by bending the web 35 into the opposite direction relative to the blade. On the other hand, each of arcuately shaped mid portions 36 of the blades is also tightly secured by the center plastic support 23 through a supporting pit 40 of the blade 30 as shown in FIG. 4. An arcuate indent 39 is arranged in the individual blades 30 along an outer peripheral edge 37 so as to form a sharp cutting edge 41 of the peripheral edge 37. As shown in FIGS. 5 and 6, the inner cutter 1 also has a plurality of openings 24 for discharging cut hairs.

Figure 7A:
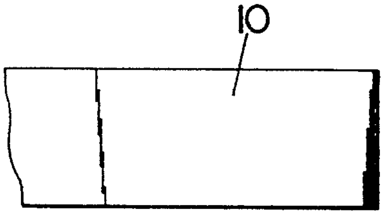
FIGS. 7A to 7C show the metal sheet, as seen in different view angles.
Figure 7B:
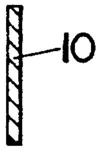
Figure 7C:
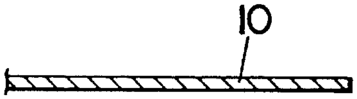
Figure 8A:
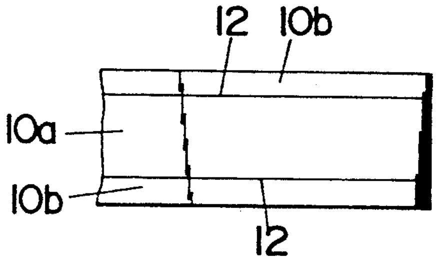
FIGS. 8A to 8D show a step of forming two V-shaped notches in the metal sheet by use of upper and lower dices, as seen in different view angles.
Figure 8B:
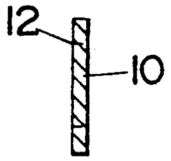
Figure 8C:
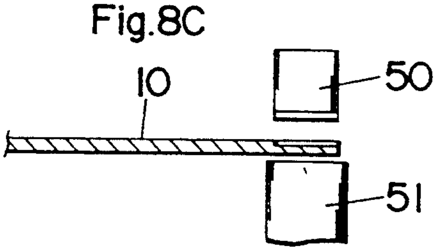
Figure 8D:
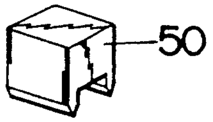

In this embodiment, the archlike blades of the present invention are formed on the elongated metal sheet shown in FIGS. 7A to 7C. The elongated metal sheet 10 consists of a plurality of rectangular plates, each of which has an enough length for forming the inner cutter. The process of forming the inner cutter of the present invention comprises the following steps.

[1] Two V shaped notches 12 extending along the length of the sheet 10 and in parallel With each other are formed in the plane of the sheet by use of upper and lower dices 50 and 51 as shown in FIGS. 8A to 8D, so that a blades forming section **10*a* is positioned between locating sections 10*b*** in the sheet.

Figure 9A:
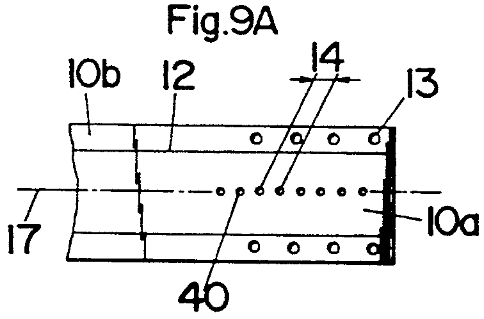
FIGS. 9A to 9D show a step of forming a plurality of supporting pits and locating holes in the metal sheet by use of upper punches and a lower dice, as seen in different view angles.
Figure 9B:
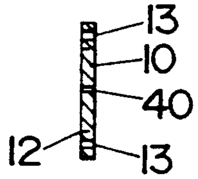
Figure 9C:
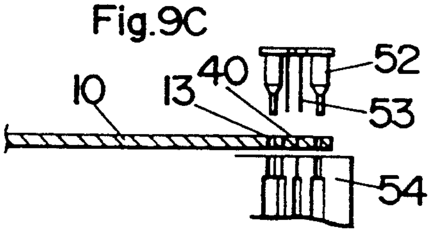
Figure 9D:
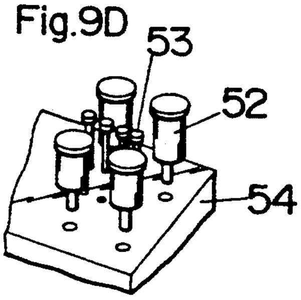
Figure 10A:
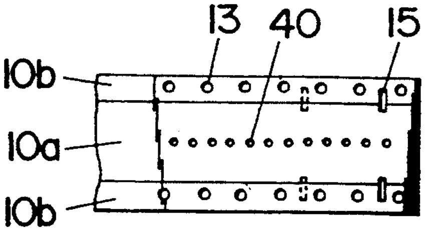
FIGS. 10A to 10D show a step of forming a plurality of rectangular holes in the metal sheet by use of an upper punch and a lower dice, as seen in different view angles.
Figure 10B:
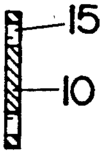
Figure 10C:
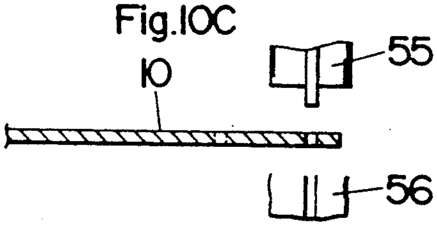
Figure 10D:
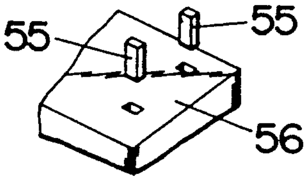

[2] A plurality of locating holes 13 are disposed along the V shaped notches 12 in the locating section **10*b*** and spaced by a predetermined pitch. On the other hand, the supporting pits 40 are arranged on a center line 17 extending longitudinally of the blades forming section 10*a* and spaced by a center pitch 14 which is defined as a distance between the outer and the inner peripheral edges 37 and 38 on the arcuately shaped mid portion 36 of the blade 30 as shown in FIGS. 9A and 9B. The locating holes 13 and the supporting pits 40 are respectively formed by use of upper punches 52 and 53 and a lower dice 54 as shown in FIGS. 9C and 9D.

[3] A plurality of rectangular holes 15 for relaxing a shrinkage stress at the time of molding the plastic frame 20 are formed across the V shaped notch 12 and spaced by a predetermined pitch by use of an upper punch 55 and a lower dice 56 as shown in FIGS. 10A to 10D.

Figure 11A:
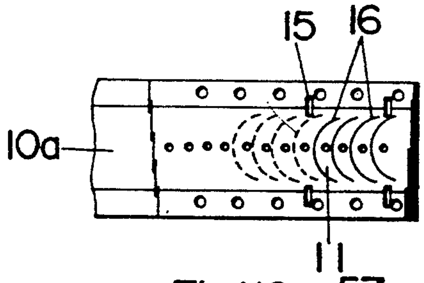
FIGS. 11A to 11D show a step of forming a plurality of arcuate cut edges such that the plane between the adjacent edges has a particular slope relative to the metal sheet by use of upper and lower dices, as seen in different view angles.
Figure 11B:
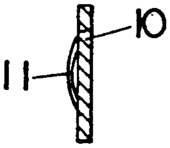
Figure 11C:
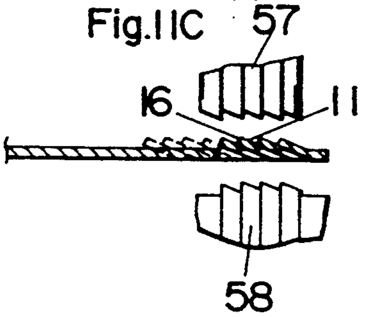
Figure 11D:
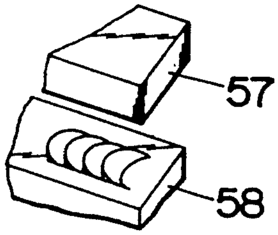

[4] A plurality of arcuate cut edges 16 are aligned along the center line 17 and spaced by the center pitch 14 so as to position the individual supporting pits 40 between the adjacent two arcuate cut edges 16 as shown in FIG. 11A. And besides, the spans 31 of the individual arcuate cut edges 16 are arranged in parallel with each other. A plane between the adjacent two arcuate cut edges 16 is defined as an archlike blade section 11. In this embodiment, four archlike blade sections are formed simultaneously by use of upper and lower dices 57 and 58 as shown in FIGS. 11C and 11D. Each of the archlike blade sections is also pressed so as to have slight upper slope relative to the metal sheet by same angle as shown FIG. 11B. By the way, in another case of the present invention, the arcuate cut edges do not always need to have a single curvature.

Figure 12A:
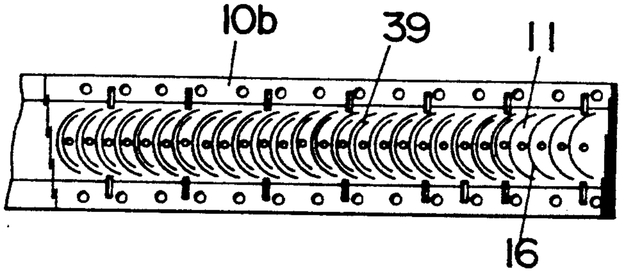
FIGS. 12A to 12D show a step of forming a plurality of arcuate indents along the cut edges in the metal sheet by use of upper and lower dices, as seen in different view angles.
Figure 12B:
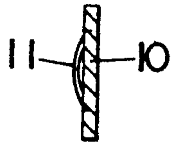
Figure 12C:
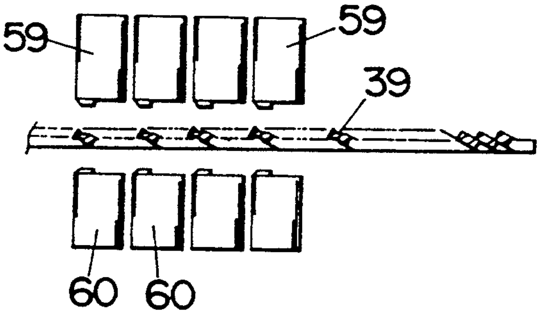
Figure 12D:
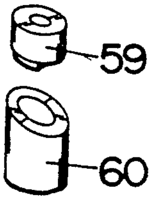
Figure 13A:
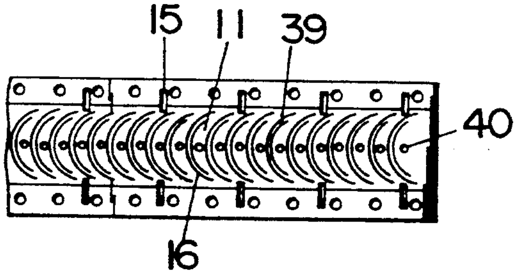
FIGS. 13A to 13D show a step of modifying the plane of the arcuate edges having undesirable slopes to the particular slope by use of upper and lower dices, as seen in different view angles.
Figure 13B:
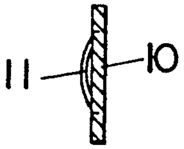
Figure 13C:
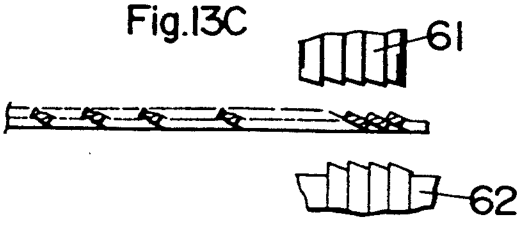
Figure 13D:
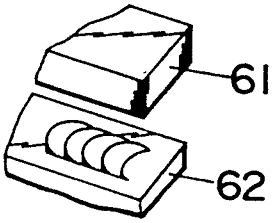

[5] The arcuate indents 39 are arranged in each of the opposite surfaces of the metal sheet so as to extend between the outer peripheral edge 37 and the supporting pit 40 of each blade section 11 as shown in FIGS. 12A and 12B. The arcuate indents 39 are formed by the use of a plurality of upper and lower dices 59 and 60 as shown in FIGS. 12C and 12D. Each of the arcuate indents 39 is arranged to form a sharp cutting edge 41 of the outer peripheral edge 37.

[6] After the step of forming the arcuate indents 39 has been completed, some of the archlike blade sections 11 often have different slopes from the upper slope. For example, some of the blade sections sometimes catch on the dice 60 when the dice 60 leaves from the metal sheet. Consequently, the blade sections are bent so as to have the different slope from the upper slope relative to the metal sheet. Therefore, the blade sections having undesirable slopes must be modified to have the slight upper slope. As shown in FIGS. 13A to 13D, the modifying of the undesirable blade sections is performed by use of upper and lower dices 61 and 62.

Figure 14A:
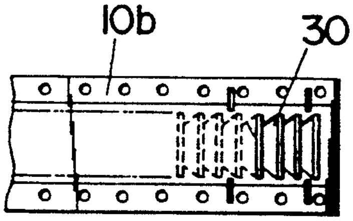
FIGS. 14A to 14D show a first bending step of the arcuate cut edges substantially normal to the metal sheet so as to form a plurality of archlike blades by use of upper and lower dices, as seen in different view angles.
Figure 14B:
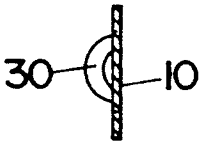
Figure 14C:
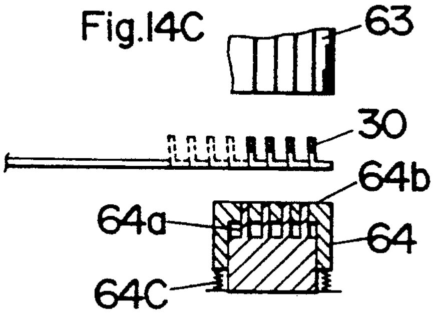
Figure 14D:
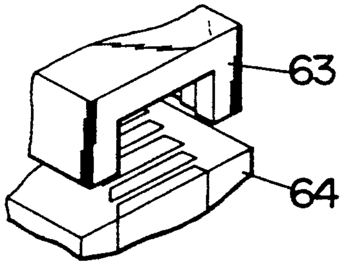
Figure 15A:
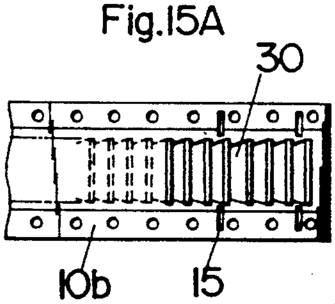
FIGS. 15A to 15D show a second bending step of the archlike blades more correctly normal to the metal sheet by use of upper and lower dices, as seen in different view angles.
Figure 15B:
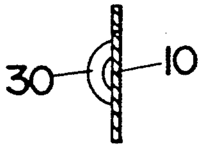
Figure 15C:
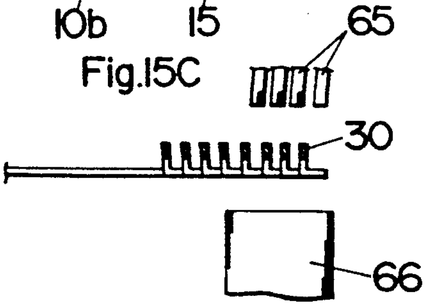
Figure 15D:
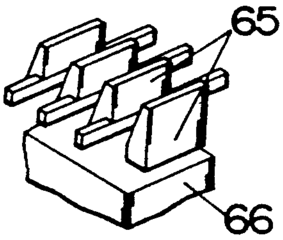

[7] and [8] The arcuate edges 16 are bent along the span 31 of the arcuate edges out of and normal to the plane of the metal sheet 10 so as to form archlike blades 30, each of which includes outer and inner peripheral edges 37 and 38. The arcuate edges are also bent in accordance with two steps consisting of first and second bending steps in order to prevent a springback of each of the archlike blades 30. That is to say, the arcuate edges 16 are bent substantially normal to the plane of the metal sheet 10 to form the archlike blades 30 in the first bending step as shown in FIGS. 14A and 14B. However, the archlike blades are not held at right angles because of the springback of the blades. Therefore, the archlike blades 30 are bent again in order to hold the blades at right angles to the sheet in the second bending step as shown in FIGS. 15A and 15B. The first bending step is performed by use of upper and lower dices 63 and 64 as shown in FIGS. 14C and 14D. The lower dice 64 includes of a plurality of projecting edges 64*a* and a movable table 64*b* as shown in FIGS. 14C. Before the first bending step, an upper surface of the movable table 64*b* and the extremities of the projecting edges 64*a* are same height, that is, on same plane. The movable table 64*b* is also supported on springs 64*c* in order to move the table up and down. When the locating sections 10*b* of the metal sheet 10 are pushed against the movable table 64*b* by the upper dice 63, the projecting edges 64*a* project on the table 64*b*, so that the arcuate edges 16 are bent, by the projecting edges 64*a*, substantially normal to the plane of the sheet 10 in order to form the archlike blades 30. The second bending step is performed by use of upper and lower dices 65 and 66 as shown in FIGS. 15C and 15D. The upper dice 65 has a plurality of perpendicular projecting walls spaced from each other by the center pitch. The locating sections of the metal sheet are fixed on the lower dice 66. Each of the perpendicular walls is interposed between the adjacent two archlike blades 30. Continuously, the walls are moved in a direction of the length of the sheet such that the archlike blades are modified to hold at right angles to the sheet. Thus obtained perpendicular archlike blades 30 are disposed in parallel with each other in the sheet 10.

Figure 16A:
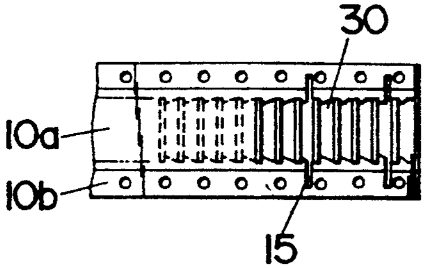
FIGS. 16A to 16D show a step of bending webs so as to form anchors by use of upper and lower dices, as seen in different view angles.
Figure 16B:
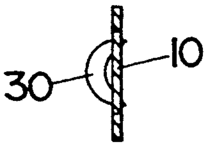
Figure 16C:
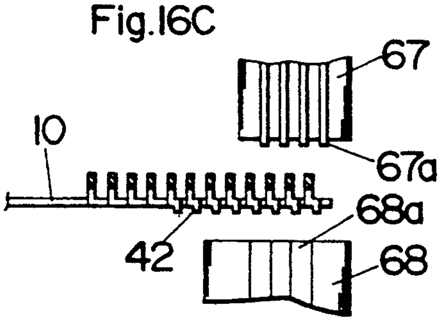
Figure 16D:
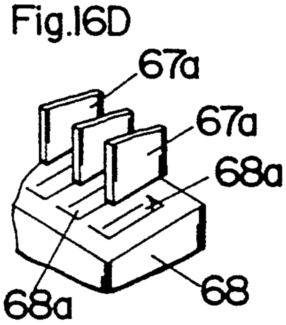

[9] The webs 35, each of which is of generally triangular configuration and is positioned between one of the lower end potions 33 of the archlike blade 30 and the marginal side portion 34, are bent in the opposite direction to the archlike blade so as to form the anchors 44 as shown in FIGS. 16A and 16B. The bending of the webs is performed by use of upper and lower dices 67 and 68 as shown in FIGS. 16C and 16D. The upper dice has a plurality of perpendicular projecting edges 67*a* arranged in parallel with each other and spaced by the center pitch. On the other hand, the lower dice 68 has a plurality of cavities 68*a* arranged in positions corresponding to the projecting edges. The projecting edges 67*a* of the upper dice are moved down toward the webs 35 of the sheet set on the lower dice 68 and into the cavities 68*a* under the webs 35 in order to form the anchors 42.

Figure 17A:
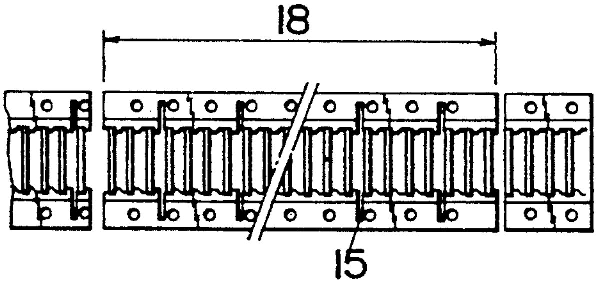
FIGS. 17A to 17D show a step of cutting off a plate having a predetermined number of the archlike blades from the metal sheet by use of a cutter and a dice, as seen in different view angles.
Figure 17B:
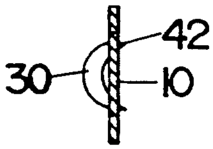
Figure 17C:
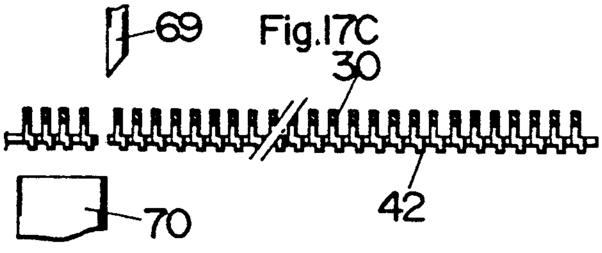
Figure 17D:
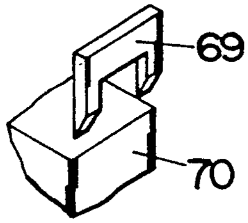

[10] The elongated metal sheet 10 having a plurality of the archlike blades 30 is cut off in order to obtain the rectangular plate 18 having a predetermined number of the blades as shown in FIG. 17A. The cutting of the rectangular plate 18 is performed by use of a cutter 69 and a table 70 as shown in FIGS. 17C and 17D.

Figure 18A:
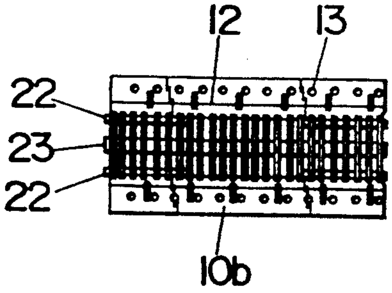
Figure 18B:
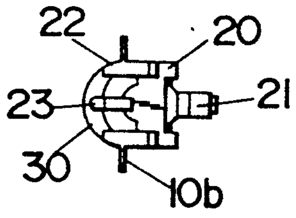

[11] The archlike blades 30 formed on the blades forming section 10*a* of the rectangular plate 18 are molded in the plastic frame including the side plastic supports 22 and the center plastic support 23 as shown in FIGS. 18A and 18B.

Figure 19A:
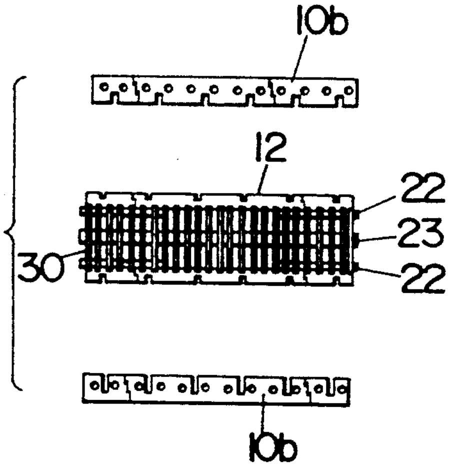
Figure 19B:
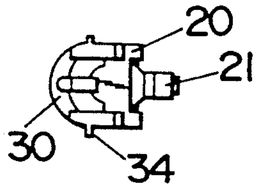

[12] The locating sections 10*b* of the rectangular plate 18 are cut off from the V shaped notches 12 as shown in FIGS. 19A and 19B.

Figure 20A:
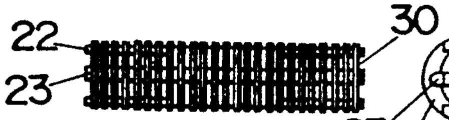
Figure 20B:
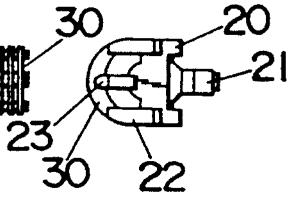
Figure 21:
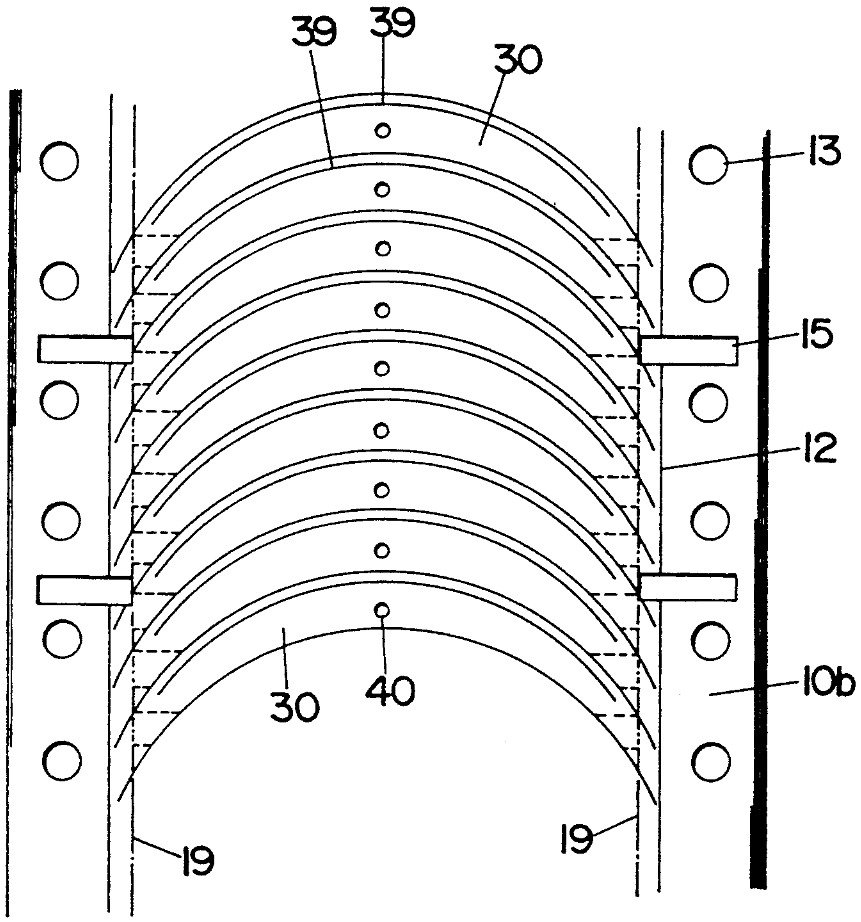
FIG. 21 is a fragmentary development of the inner cutter of the present invention.

[13] The marginal side portions 34 are removed from the blades forming section 10*a* by a grinding, so that the individual archlike blades 30 are isolated from the marginal side portions 34 and also are connected only with the plastic frame 20 as shown in FIGS. 20A and 20B. A fragmentary development of the inner cutter of the present invention is shown in FIG. 21 for explaining more details about removing the marginal side portions from the blades forming section. That is, each of grinding areas, which is positioned between a grinding line 19 and the V shaped notch 12 is removed from the blades forming section 10*a* by the grinding. A long broken line in FIG. 21 indicates a bending line of the archlike blade 30. A short broken line in FIG. 21 indicates a bending line of the anchor 42.

Figures 22A, 22B, 22C, 22D, 22E, 22F:
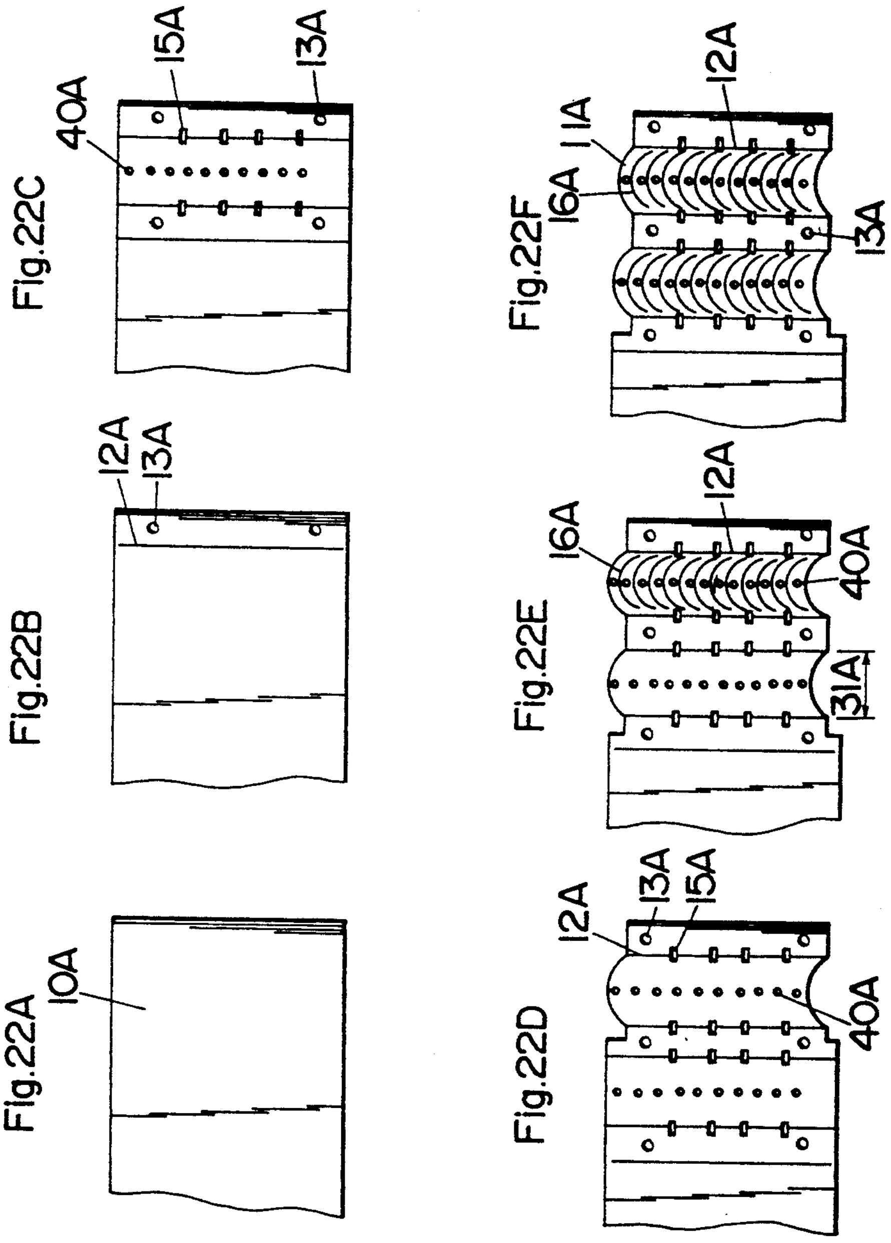
FIGS. 22A to 22L show steps of forming the inner cutter in another embodiment of the present invention.
Figures 22G, 22H, 22I, 22J, 22K, 22L:
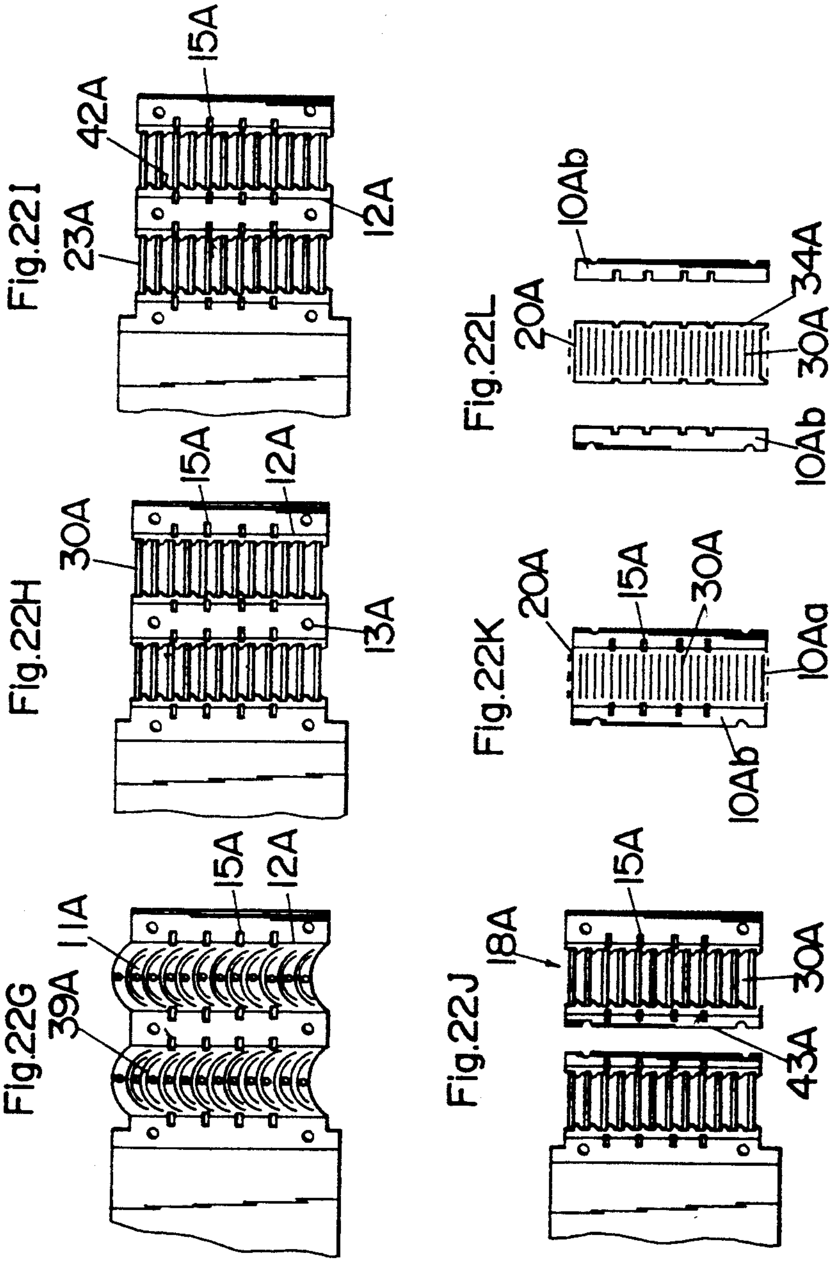

FIGS. 22A to 22L illustrate another embodiment of the present invention, This embodiment is almost identical in process to the above embodiment except for utilizing a blank metal sheet 10A in which the rectangular plates 18A are arranged on side-by-side relation as shown in FIG. 22A. Like portions are designated by like numerals with a suffixed letter of "A". The process of forming the inner cutters 1A on the blank sheet 10A includes the following step, that is, the step of forming locating holes 13A and V shaped notches 12A (FIG. 22B), the step of forming supporting pits 40A and rectangular holes 15A (FIG. 22C), the step of cutting useless portions for the inner cutter as shown in FIG. 22D, the step of forming arcuate cut edges 16A (FIG. 22E), and the step of forming arcuate indents 39A (FIG. 22F). And besides, the steps for completing the inner cutter are performed in the following order, that is, the step of modifying slopes of archlike blade sections 11A (FIG. 22G), the step of bending the archlike blade sections 11A along the span 31A of the arcuate cut edges 16A and normal to the sheet 10A in order to form archlike blades 30A (FIG. 22H), the step of forming anchors 42A (FIG. 22I), the step of cutting off the individual rectangular plates 18A from the sheet 10A at a cutting line 43A extending through the locating holes 13A between the adjacent two rectangular plates 18A (FIG. 22J), the step of molding in the archlike blades 30A into the plastic frame 20A (FIG. 22K), the step of cutting off the locating sections 10Ab from the rectangular plate 18A (FIG. 22L), and the step of removing the marginal side portions 34A from the blades forming section 10Aa (not shown). Therefore, a plurality of the inner cutters are formed from a single piece of the blank metal sheet by the above steps of the present invention.

What is claimed is:

1. A process of forming an inner cutter for use in a dry shaver, said inner cutter comprising a plurality of arcuate blades which are supported on a molded plastic frame to align along a length of said plastic frame in substantially parallel relation to each other, said process utilizing an elongated metal sheet from which said arcuate blades are commonly obtained, said process comprising the steps of:

cutting into said metal sheet to form a plurality of arcuate cut edges aligned along the length of said metal sheet to define individual arcuate blade sections within the plane of said sheet between adjacent two arcuate cut edges, each arcuate cut edge having a span extending transversely of said sheet between opposed marginal side portions of said sheet and having a rise extending longitudinally of said sheet;

bending said blade sections along the span of said arcuate cut edges so as to erect said blade sections in a plane substantially normal to the plane of said metal sheet, thereby forming said arcuate blades upstanding from said metal sheet between said opposed marginal side portions, while leaving said arcuate blades interconnected by way of webs defined by a portion of said sheet and extending in the plane of said sheet between lower end portions of the adjacent arcuate blades and through said marginal side portions of said sheet, each of said arcuate blades having a height equal to said rise and an outer peripheral edge corresponding to said arcuate cut edge and connected to the adjacent arcuate blades at their lower end portion through said webs and said marginal side portions;

molding the lower end portions of the individual arcuate blades including said webs into said plastic frame so that the individual arcuate blades are thereby supported by both said marginal side portions and said plastic frame;

cutting off said webs from said marginal side portions of said sheet to separate the individual arcuate blades from said marginal side portions, thereby isolating said arcuate blades from each other while keeping said arcuate blades supported by said plastic frame.

2. A process as set forth in claim 1, wherein said marginal side portions are cooperative with said webs arranged along the length of said sheet to define separation lines which extend longitudinally of said sheet and along which said cutting is effected to separate the individual arcuate blades from said marginal side portions in such a manner that each of said webs is separated from one of two adjacent arcuate blades while being held integral with the other arcuate blade.

3. A process as set forth in claim 1, wherein each of said webs is of generally triangular configuration having two sides merging with the lower end portion of one of the two adjacent arcuate blades and with said marginal side portion.

4. A process as set forth in claim 2 or 3, wherein said webs comprise depending anchors to be embedded in said plastic frame.

5. A process as set forth in claim 1, wherein said individual blade sections are bent simultaneously into said individual arcuate blades.

6. A process as set forth in claim 1, wherein said marginal side portions are formed with holes adjacent to said webs for relaxing a shrinkage stress at the time of molding the plastic into said support around said webs.

* * * * *